United States Patent
Ueda et al.

(10) Patent No.: US 11,926,054 B2
(45) Date of Patent: Mar. 12, 2024

(54) ROBOT CONTROL METHOD

(71) Applicant: Panasonic Intellectual Property Management Co., Ltd., Osaka (JP)

(72) Inventors: Hiroyoshi Ueda, Osaka (JP); Hiroyuki Nakata, Osaka (JP); Atsumi Hashimoto, Osaka (JP); Ryosuke Yamamoto, Osaka (JP); Masayoshi Iwatani, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 335 days.

(21) Appl. No.: 17/531,267

(22) Filed: Nov. 19, 2021

(65) Prior Publication Data

US 2022/0072702 A1     Mar. 10, 2022

Related U.S. Application Data

(63) Continuation of application No. PCT/JP2020/017624, filed on Apr. 24, 2020.

(30) Foreign Application Priority Data

Jun. 4, 2019   (JP) ................. 2019-104609

(51) Int. Cl.
   *B25J 9/16*       (2006.01)
   *G05B 19/19*     (2006.01)
(52) U.S. Cl.
   CPC ........... *B25J 9/1641* (2013.01); *B25J 9/1638* (2013.01); *G05B 19/19* (2013.01); *G05B 2219/39176* (2013.01); *G05B 2219/39195* (2013.01)

(58) Field of Classification Search
   CPC ....... B25J 9/1641; B25J 9/1638; G05B 19/19; G05B 2219/39176; G05B 2219/39195
   See application file for complete search history.

(56) References Cited

FOREIGN PATENT DOCUMENTS

| JP | 9-174466 | 7/1997 |
|---|---|---|
| JP | 2010-058256 | 3/2010 |
| JP | 2013-094947 | 5/2013 |
| JP | 2014-180726 | 9/2014 |
| JP | 2019-188500 | 10/2019 |

OTHER PUBLICATIONS

Office Action dated Jul. 13, 2023 in corresponding Indian Patent Application No. 202147055601.
International Search Report of PCT application No. PCT/JP2020/017624 dated Jul. 14, 2020.

*Primary Examiner* — Adam R Mott
*Assistant Examiner* — Heather J Keniry
(74) *Attorney, Agent, or Firm* — Wenderoth, Lind & Ponack, L.L.P.

(57) ABSTRACT

A determination value calculated based on a distance from a work point of a tip of robot arm (10) to virtual straight line (30) passing through an axis of second joint (J2) and an axis of third joint (J3) is compared with a predetermined threshold. A method of calculating deflection compensation amounts for second joint (J2) and third joint (J3) is changed depending on whether the determination value is larger or smaller than the threshold. Second joint (J2) and third joint (J3) are caused to pivot based on the calculated deflection compensation amounts.

2 Claims, 11 Drawing Sheets

DEFLECTION COMPENSATION ACCORDING TO PRESENT EXEMPLARY EMBODIMENT $\theta_2 = -90°$ $\theta_2 = 0°$ $\theta_2 = 90°$

ROBOT CONTROL METHOD

TECHNICAL FIELD

The present invention relates to a robot control method.

BACKGROUND ART

Conventionally, an articulated robot including a robot arm having a plurality of joints is known (see, for example, PTL 1).

In such an articulated robot, the arm may be flexurally deformed by its own weight or a load applied to the tip of the arm. This deformation of the arm occurs particularly prominently at a joint with a rotary shaft. That is, when a member forming a joint having a movable is elastically deformed, the joint may be displaced in the movable direction from a target position.

PTL 1 discloses a configuration in which the actual angle of a joint is obtained for each arm, a displacement amount that is the difference between the obtained actual angle and a command angle for control from a control device is obtained, and the command angle applied from the control device to the joint is compensated on the basis of the displacement amount.

CITATION LIST

Patent Literature

PTL 1: Unexamined Japanese Patent Publication No. 2010-58256

SUMMARY OF THE INVENTION

Meanwhile, according to the invention disclosed in PTL 1, only the angle of a joint having the rotary shaft that rotates in the gravity direction is compensated, and no consideration is given to a joint that does not rotate in the gravity direction.

Specifically, even a joint having no rotary shaft that rotates in the gravity direction is deflected in the tilting direction of the rotary shaft itself due to the elastic deformation of a speed reducer or a bearing in the joint. Accordingly, the arm tip cannot be accurately positioned, and hence the accuracy of machining performed using the robot is reduced, resulting in a problem.

The present invention has been made in view of such a point and has its object to suppress the positional displacement of the tip of a robot arm caused by the deflection of a joint of the robot arm.

The present invention provides the following means for solving the problem for a method of controlling a robot that controls the operation of a robot arm including at least a first joint, a second joint, a third joint, and a fourth joint.

That is, according to a first invention, a first joint, a second joint, a third joint, and a fourth joint each have a rotary shaft,
the first joint and the fourth joint being configured such that tilts of respective rotary shafts affect positional displacement of a tip of the robot arm, and
the second joint and the third joint being configured such that a rotary shaft of each of the second joint and the third joint rotates in a gravity direction,
the first invention characterized by comprising:
calculating a deflection angle of the first joint based on moment rigidity of the first joint and gravitational torque applied in a tilting direction of the rotary shaft of the first joint;
calculating a deflection angle of the second joint based on a spring constant of the second joint and a gravitational torque applied in a pivoting direction of the second joint;
calculating a deflection angle of the third joint based on a spring constant of the third joint and a gravitational torque applied in a pivoting direction of the third joint;
calculating a deflection angle of the fourth joint based on moment rigidity of the fourth joint and gravitational torque applied in a tilting direction of the rotary shaft of the fourth joint;
calculating a determination value based on a distance from a work point of the tip of the robot arm to a virtual straight line passing through an axis of the rotary shaft of the second joint and an axis of the rotary shaft of the third joint;
comparing the determination value with a predetermined threshold;
calculating a deflection compensation amount for the second joint based on deflection angles of the first joint, the second joint, and the fourth joint and calculating a deflection compensation amount for the third joint based on deflection angles of the first joint, the third joint, and the fourth joint when the determination value is larger than the threshold value;
calculating a deflection compensation amount for the second joint based on deflection angles of the first joint, the second joint, and the fourth joint, and the threshold value and calculating a deflection compensation amount for the third joint based on deflection angles of the first joint, the third joint, and the fourth joint, and the threshold value when the determination value is smaller than the threshold value; and
causing the second joint and the third joint to pivot based on the deflection compensation amounts for the second joint and the third joint.

According to a first aspect of the present invention, the determination value calculated based on the distance from the work point of the tip of a robot arm to a virtual straight line passing through the axis of the rotary shaft of a second joint and the axis of the rotary shaft of a third joint is compared with a predetermined threshold.

When the determination value is larger than the threshold, a deflection compensation amount for the second joint is calculated based on the deflection angles of the first joint, the second joint, and the fourth joint. A deflection compensation amount for the third joint is calculated based on the deflection angles of the first joint, the third joint, and the fourth joint.

On the other hand, when the determination value is smaller than the threshold, a deflection compensation amount for the second joint is calculated based on the deflection angles of the first joint, the second joint, and the fourth joint, and a threshold value. A deflection compensation amount for the third joint is calculated based on the deflection angles of the first joint, the third joint, and the fourth joint, and a threshold value.

The second joint and the third joint are caused to pivot based on the calculated deflection compensation amounts.

As described above, the positional displacement of the tip of the robot arm can be suppressed by compensating not only the deflection angles of the second joint and the third joint using the second joint and the third joint that are pivotable in the gravity direction but also the tilts of the rotary shafts of the first joint and the fourth joint.

In this case, the deflection angle is an angle deviated from a target set angle.

Note that the method of calculating deflection compensation amounts for the second joint and the third joint is changed based on the comparison result between the determination value and the threshold for the following reasons.

The inventor of the present application has found that there is a specific position in which the deflection compensation amount rapidly increases when the robot arm is in a predetermined position. It was then found that such a specific position occurs when the distance between the work point of the tip of the robot arm and the virtual straight line approaches "0".

Accordingly, in the present invention, a threshold for determining that the robot arm approaches a specific position is set, and when the determination value is smaller than the threshold, a deflection compensation amount is calculated using a calculation formula capable of suppressing a rapid increase in deflection compensation amount.

This makes it possible to continuously correct the operation of robot arm and suppress unstable control.

According to a second aspect of the present invention, in the first aspect, the determination value is the value obtained by integrating the distance between the axes of the second joint and the third joint and the distance from the work point of the tip of the robot arm to the virtual straight line.

The second aspect of the present invention uses, as the determination value, the value obtained by integrating the distance between the axes of the rotary shafts of the second joint and the third joint and the distance from the work point of the tip of the robot arm to the virtual straight line.

According to the present invention, it is possible to suppress the positional displacement of the tip of the robot arm caused by deflection of the joint of the robot arm.

DESCRIPTION OF EMBODIMENT

An exemplary embodiment of the present invention will be described below with reference to the accompanying drawings. Note that the following description of the preferable exemplary embodiment is essentially merely an example, and is not intended to limit the present invention, and application or usage of the present invention.

Figure 1:
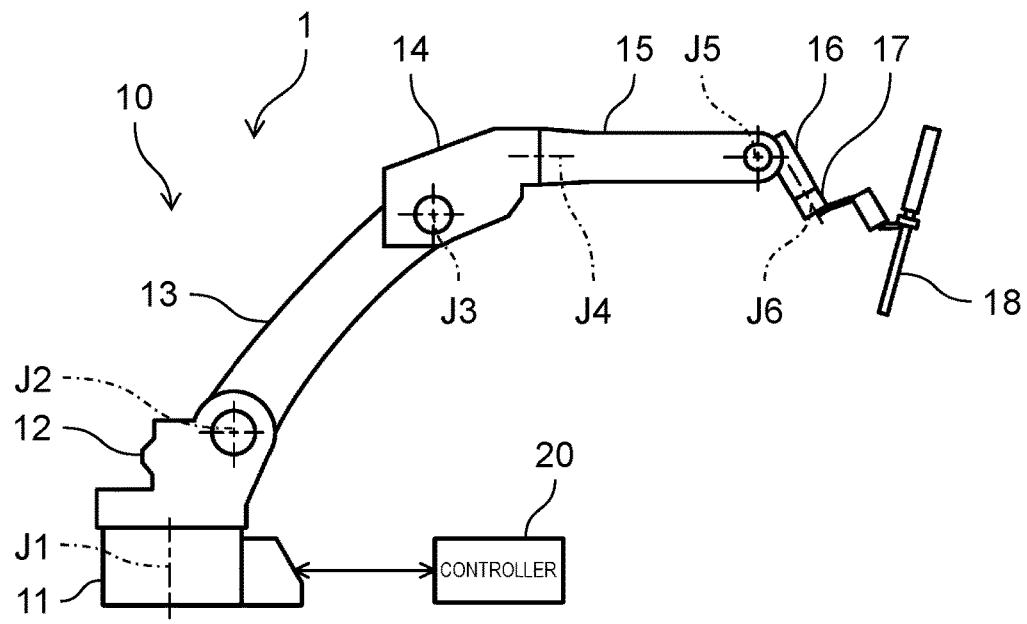
FIG. 1 is a side view illustrating a configuration of a robot according to the present exemplary embodiment.

As illustrated in FIG. 1, robot 1 includes six-axis articulated robot arm and controller 20 that controls the operation of robot arm 10.

Robot arm 10 includes base 11, shoulder 12, lower arm 13, first upper arm 14, second upper arm 15, wrist 16, and attachment 17. Robot arm 10 further includes first joint J1, second joint J2, third joint J3, fourth joint J4, fifth joint J5, and sixth joint J6. Each of first joint J1, second joint J2, third joint J3, fourth joint J4, fifth joint J5, and sixth joint J6 has a rotary shaft.

Shoulder 12 is supported on base 11 so as to be turnable in the horizontal direction about the rotary shaft of first joint J1. Lower arm 13 is supported on shoulder 12 so as to be pivotable in the gravity direction about the rotary shaft of second joint J2.

First upper arm 14 is supported on lower arm 13 so as to be pivotable in the gravity direction about the rotary shaft of third joint J3. Second upper arm 15 is supported on first upper arm 14 so as to be torsionally rotatable about the rotary shaft of fourth joint J4.

Wrist 16 is supported on second upper arm 15 so as to be pivotable in the gravity direction about the rotary shaft of fifth joint J5. Attachment 17 is supported on wrist 16 so as to be torsionally rotatable about the rotary shaft of sixth joint J6. Tool 18 such as a welding torch is attached to attachment 17.

An actuator (not illustrated) is built in each of first joint J1 to sixth joint J6. Controller 20 controls the driving of the actuators of first joint J1 to sixth joint J6 on the basis of an operation program input in advance by teaching or the like such that first joint J1 to sixth joint J6 reach target positions (command angles), respectively.

Figure 2:
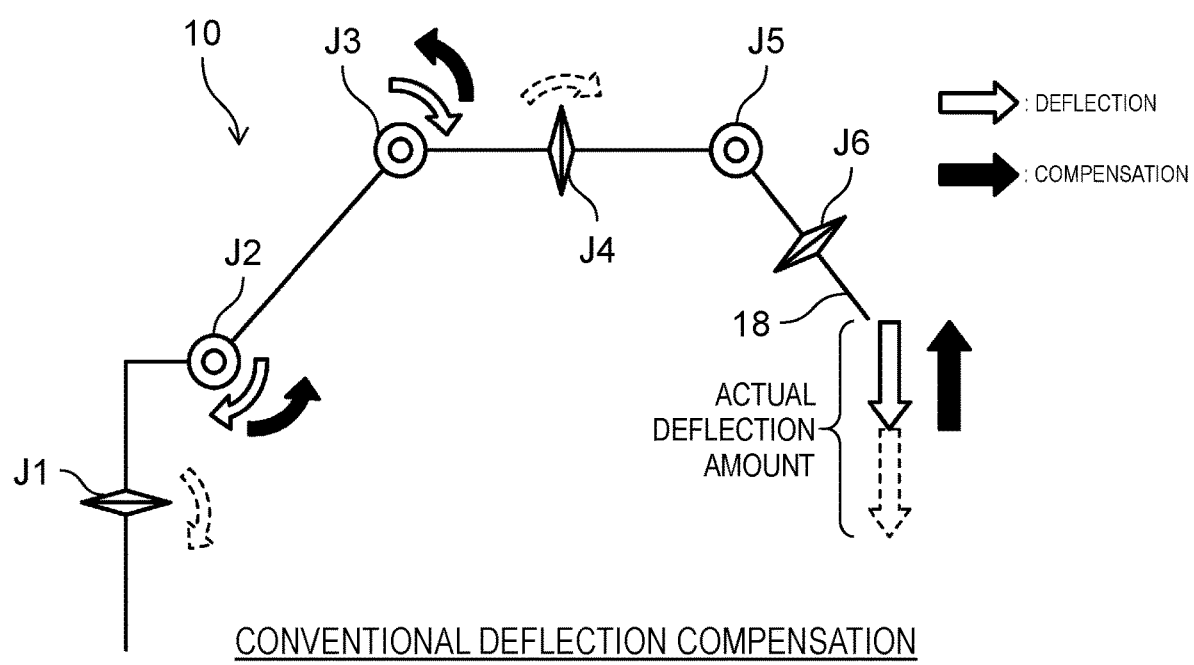
FIG. 2 is a view illustrating a modeled system configuration of a conventional robot arm.

FIG. 2 is a view illustrating a modeled system configuration of conventional robot arm 10. With reference to FIG. 2, a deflection direction generated at each joint of robot arm 10 is indicated by a white arrow, and a compensation direction for eliminating deflection is indicated by a black arrow.

Note that the deflection generated at fifth joint J5 and sixth joint J6 has a small influence on the positional displacement of the work point of tool 18 at the tip of robot arm 10 and can be ignored, and hence no consideration is given to fifth joint J5 and sixth joint J6.

Second joint J2 and third joint J3 are pivotable in the gravity direction. As shown in FIG. 2, conventional robot arm 10 is configured to consider only the static elastic deflection generated in second joint J2 and third joint J3 and eliminate the deflection.

More specifically, the gravitational torque acts on second joint J2 and third joint J3 in the clockwise direction in FIG. 2, and deflection occurs in the pivoting direction of each rotary shaft. Accordingly, second joint J2 and third joint J3 are caused to pivot in the counterclockwise direction in FIG. 2 to cancel the deflection generated in second joint J2 and third joint J3, thereby compensating the positional displacement generated at the work point of tool 18.

However, as indicated by the dotted arrows in FIG. 2, the gravitational torque also acts on first joint J1 and fourth joint J4 in the tilting direction of each rotary shaft. This gravitational torque causes elastic deformation of a speed reducer and a bearing (not illustrated) of first joint J1 and fourth joint J4. This causes deflection in first joint J1 and fourth joint J4 in the tilting direction of each rotary shaft. Therefore, in practice, the positional displacement of the work point of tool 18 increases by the amount indicated by the dotted arrows.

Therefore, in the present exemplary embodiment, second joint J2 and third joint J3 are rotated in consideration of the static elastic deflection generated in first joint J1 and fourth joint J4, so that the positional displacement of the work point of tool 18 can be eliminated.

Figure 3:
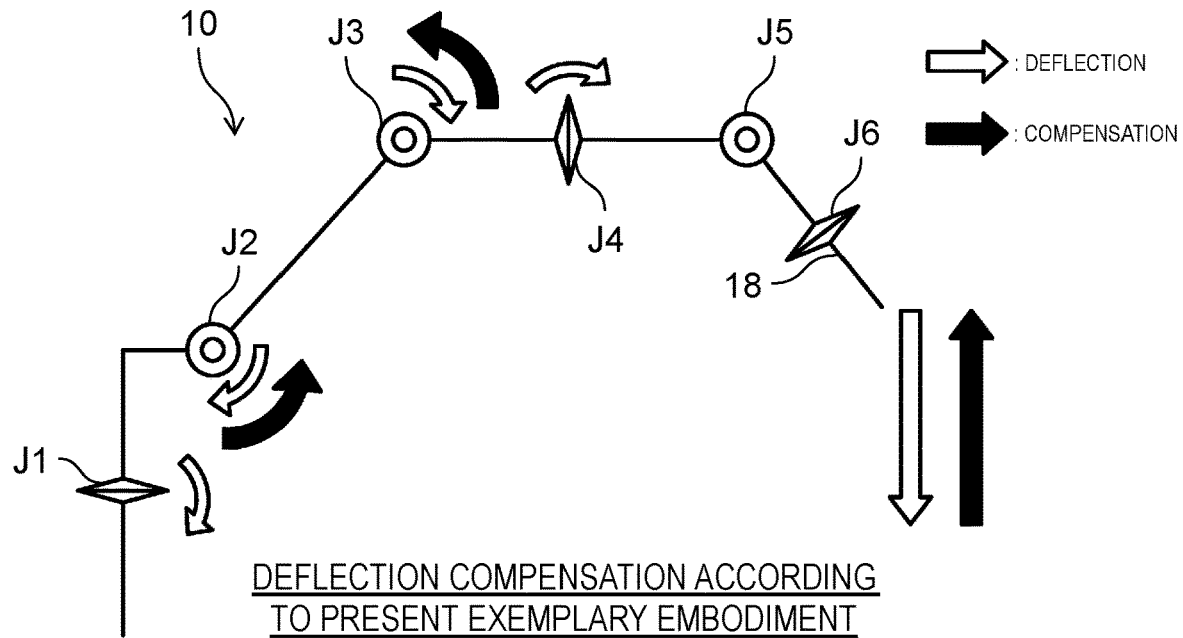
FIG. 3 is a view illustrating a modeled system configuration of the robot arm according to the present exemplary embodiment.

More specifically, as illustrated in FIG. 3, the gravitational torque acts on first joint J1 and fourth joint J4 in the clockwise direction in FIG. 3 to cause deflection in first joint J1 and fourth joint J4 in the tilting direction of each rotary shaft. More specifically, the gravitational torque acts on second joint J2 and third joint J3 in the clockwise direction in FIG. 3, and deflection occurs in the pivoting direction of each rotary shaft.

Accordingly, second joint J2 and third joint J3 are caused to pivot in the counterclockwise direction in FIG. 3 to compensate the deflection amounts of second joint J2 and third joint J3 and also compensate the deflection amounts of first joint J1 and fourth joint J4.

This makes it possible to obtain a compensation amount (illustrated by the black arrow) for canceling the deflection amount (illustrated by the white arrow) of the work point of tool 18 and to eliminate the positional displacement of the work point of tool 18.

Figure 4:
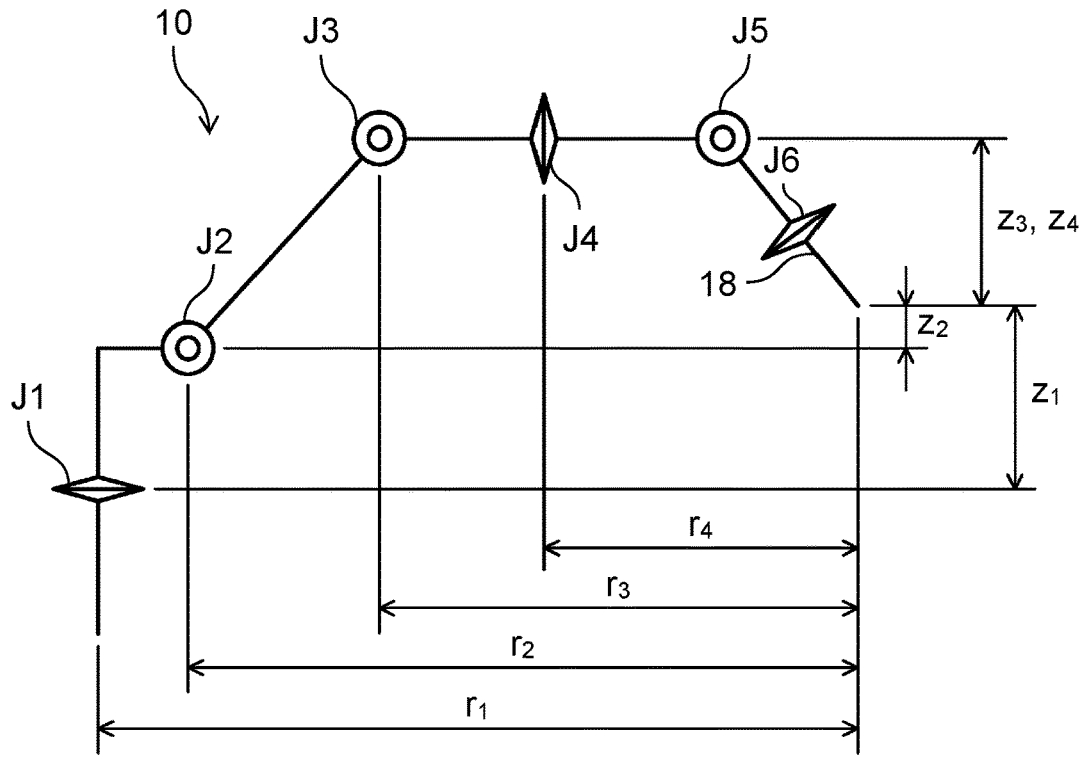
FIG. 4 is a diagram illustrating distances between a work point of a tool and each joint in a horizontal direction and a vertical direction.

A method of calculating compensation amounts for second joint J2 and third joint J3 will be described below. As illustrated in FIG. 4, the horizontal distance between the work point of tool 18 and the i-th joint is $r_i$ [m], the vertical distance between the work point of tool 18 and the i-th joint is $z_i$ [m], the joint angle of the i-th joint is $\theta_i$ [°], the torsional spring constant (to be simply referred to as a spring constant hereinafter) of the i-th joint is $k_i$ [Nm/rad], and the moment rigidity of the i-th joint is $M_i$ [Nm/rad]. In the present exemplary embodiment, i is 1, 2, 3, or 4.

The mass of robot arm 10 and tool 18 is m [kg], the barycentric position of robot arm 10 and tool 18 is $x_g$, and the length of robot arm 10 and tool 18 is L [m].

Gravitational torque $\tau_i$ [Nm] applied in the pivoting direction of the i-th joint can be expressed by a function of $\tau_i = f_1(m, x_g, L, \theta_i)$. Furthermore, gravitational torque $W_i$ [Nm] applied in the tilting direction of the rotary shaft of the i-th joint can be expressed by a function of $W_i = f_2(m, x_g, L, \theta_i)$.

Horizontal distance $r_i$ between the work point of tool 18 and the i-th joint can be expressed by a function of $r_i = f_3(L, \theta_i)$. Vertical distance $z_i$ between the work point of tool 18 and the i-th joint can be expressed by a function of $z_i = f_4(L, \theta_i)$.

Next, the deflection angle due to the gravitational torque applied in the pivoting direction of second joint J2 and third joint J3 is calculated. More specifically, the deflection angle of second joint J2 can be expressed by $\tau_2/k_2$. The deflection angle of third joint J3 can be expressed by $\tau_3/k_3$. Note that these calculations are performed by controller 20.

Next, the displacement given to the work point of tool 18 by the tilt of the rotary shafts of first joint J1 and fourth joint J4, that is, the deflection amount, is calculated. The compensation amount can be calculated based on the deflection amounts in the horizontal direction and the vertical direction.

More specifically, total deflection amount $\Sigma_r$ in the horizontal direction can be calculated by equation (1) given below.

$$\Sigma r = (W_1/M_1)z_1 + (W_4/M_4)z_4 \tag{1}$$

Total deflection amount Ez in the vertical direction can be calculated by equation (2) given below.

$$\Sigma r = (W_1/M_1)r_1 + (W_4/M_4)r_4 \tag{2}$$

Assuming that the compensation amount for the i-th joint is $\Delta\theta_i$ [rad], compensation amount $\Delta\theta_2$ for second joint J2 can be calculated by equation (3) given below.

$$\Delta\theta_2 = (\tau_2/k_2) + (z_3 - \Sigma_z - r_3 - \Sigma_r)/(z_3 r_2 - r_3 z_2)_4 \tag{3}$$

That is, compensation amount $\Delta\theta_2$ of second joint J2 is calculated based on the deflection angles of first joint J1, second joint J2, and fourth joint J4.

Compensation amount $\Delta\theta_3$ for third joint J3 can be calculated by equation (4) given below.

$$\Delta\theta_3 = (\tau_3/k_3) + (r_2 - \Sigma r - z_2 - \Sigma z)/(z_3 \cdot r_2 - r_3 \cdot z_2) \tag{4}$$

That is, compensation amount $\Delta\theta_3$ of third joint J3 is calculated based on the deflection angles of first joint J1, third joint J3, and fourth joint J4. Controller 20 then drives second joint J2 based on compensation amount $\Delta\theta_2$ of second joint J2 and drives third joint J3 based on compensation amount $\Delta\theta_3$ of third joint J3. This makes it possible to eliminate the deflection generated in first joint J1 to fourth joint J4.

The relationship between joint angle $\theta_2$ of second joint J2 and an error with respect to the target position of the work point of tool 18 will be described below.

Figure 5:
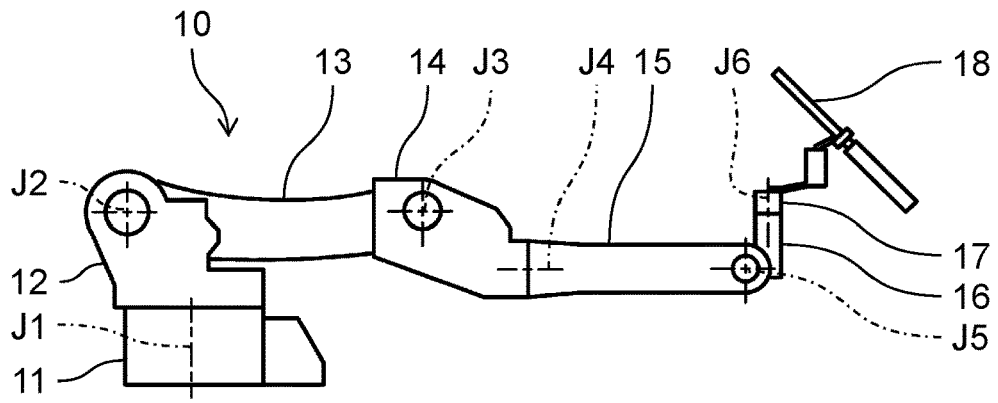
FIG. 5 is a view illustrating a position of the robot arm when a joint angle of a second joint is set to −90°.

First, in a state in which lower arm 13, first upper arm 14, and second upper arm 15 of robot arm 10 are linearly extended, as illustrated in FIG. 5, joint angle $\theta_2$ of second joint J2 is set to −90°. In this state, robot arm 10 is in a horizontally extending position horizontally extending rightward in FIG. 5.

Figure 6:
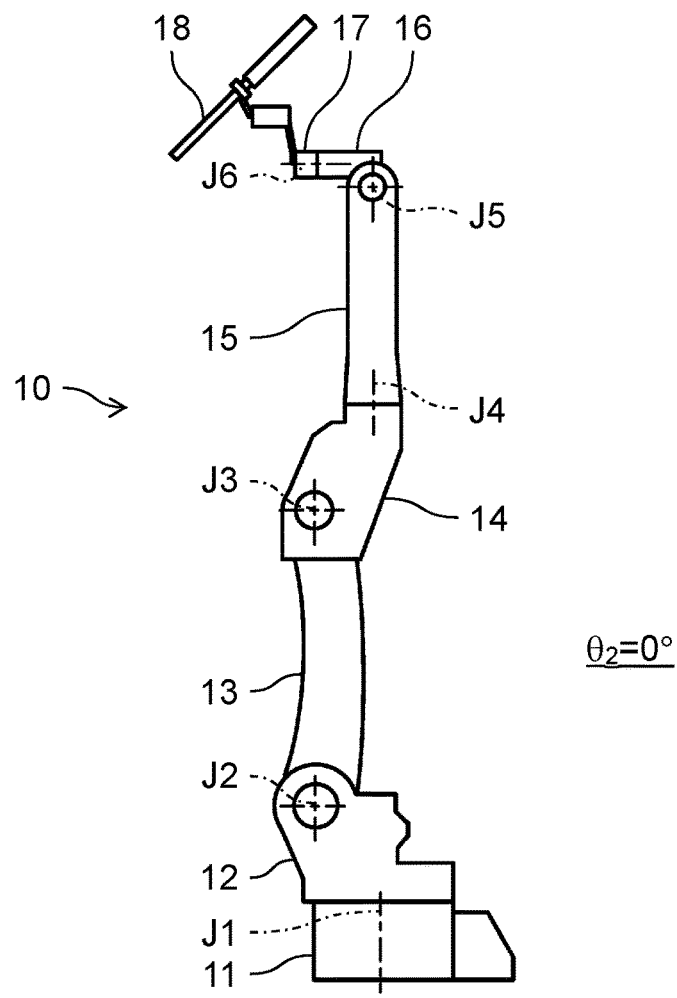
FIG. 6 is a view illustrating the position of the robot arm when the joint angle of the second joint is set to 0°.

Next, as illustrated in FIG. 6, joint angle $\theta_2$ of second joint J2 is set to 0°. In this state, robot arm 10 extends vertically upward in FIG. 6.

Figure 7:
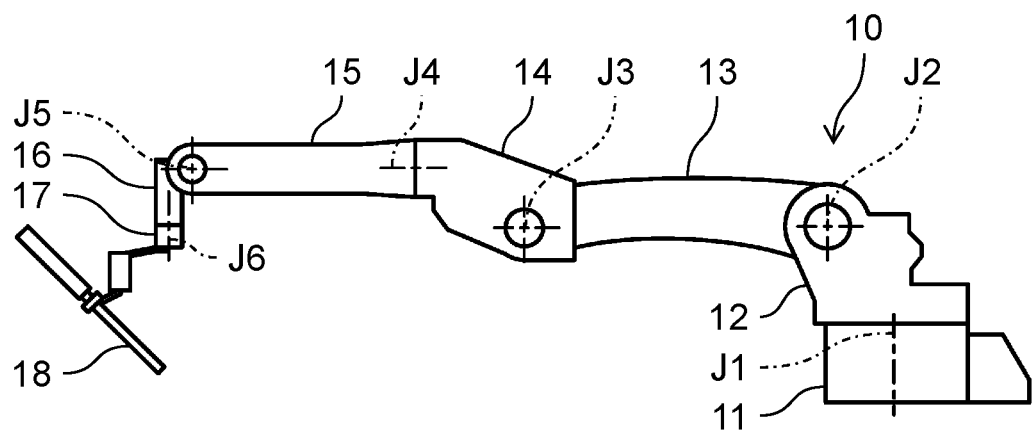
FIG. 7 is a view illustrating the position of the robot arm when the joint angle of the second joint is set to 90°.

As illustrated in FIG. 7, joint angle $\theta_2$ of second joint J2 is set to 90°. In this state, robot arm 10 is in a horizontally extending position horizontally extending leftward in FIG. 7.

In this case, when robot arm 10 sequentially changes joint angle $\theta_2$ of second joint J2 so as to take the position illustrated in FIGS. 5 to 7, controller calculates the horizontal error and the vertical error of the work point of tool 18 in real time. The results are illustrated in the graphs in FIGS. 8 and 9.

Figure 8:
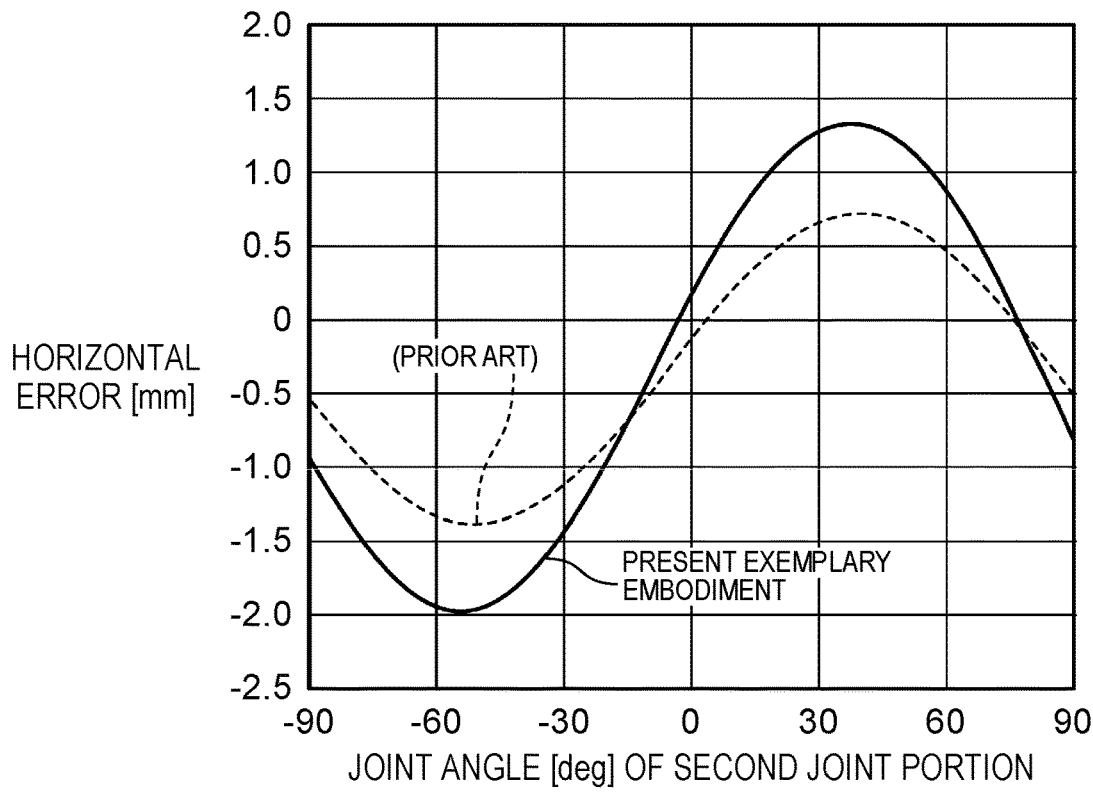
FIG. 8 is a graph illustrating a relationship between the joint angle of the second joint and a horizontal error of the work point of the tool.

With reference to FIG. 8, the dotted line indicates the relationship between joint angle $\theta_2$ of second joint J2 and the horizontal error in the conventional deflection compensation method, that is, in consideration of only the deflections generated in second joint J2 and third joint J3. In addition, the solid line indicates the relationship between joint angle $\theta_2$ of second joint J2 and the horizontal error in the deflection compensation method according to the present exemplary embodiment, that is, in consideration of all the deflections generated in first joint J1 to fourth joint J4.

Figure 9:
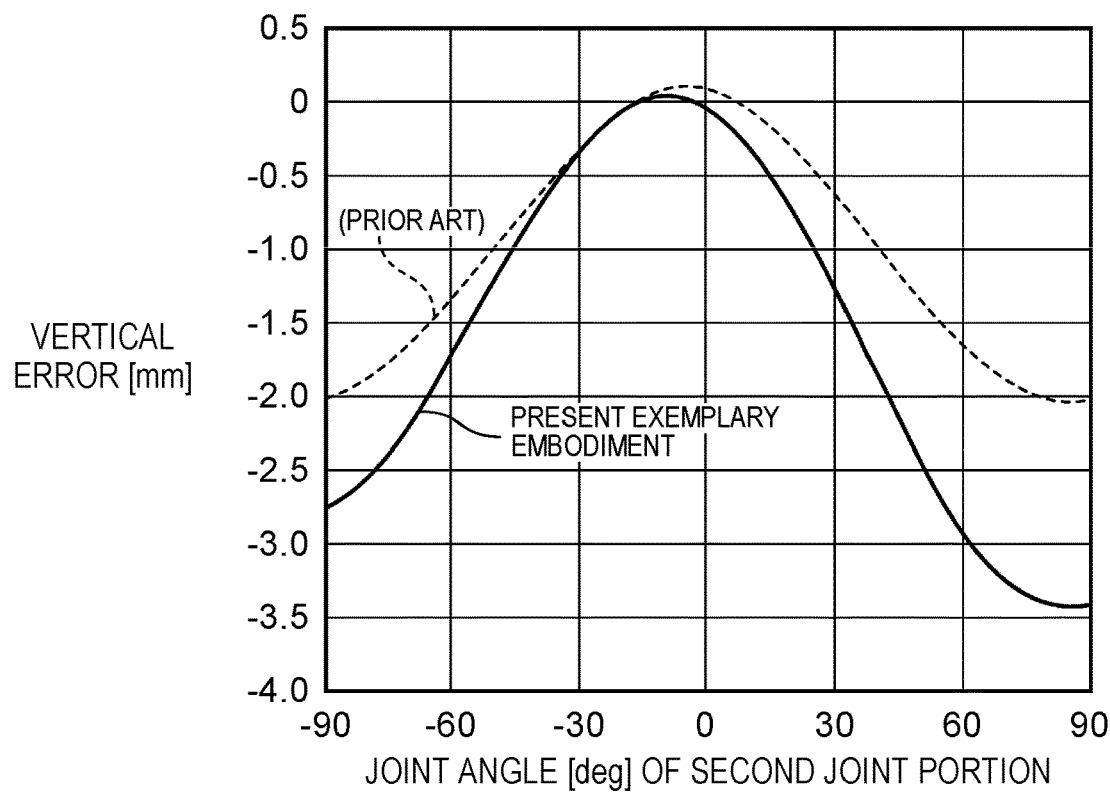
FIG. 9 is a graph illustrating a relationship between the joint angle of the second joint and a vertical error of the work point of the tool.

With reference to FIG. 9, the dotted line indicates the relationship between joint angle $\theta_2$ of second joint J2 and the vertical error in the conventional deflection compensation method. In addition, the solid line indicates the relationship between joint angle $\theta_2$ of second joint J2 and the vertical error in the deflection compensation method according to the present exemplary embodiment.

As illustrated in FIGS. 8 and 9, it can be seen that, in the deflection compensation method according to the present exemplary embodiment, the large horizontal and vertical errors are calculated with respect to the target position (position corresponding to error 0) as compared with the conventional deflection compensation method.

Accordingly, in calculating a compensation amount, a compensation amount can be calculated in consideration of an actual deflection angle as compared with the conventional deflection compensation method, and the positional displacement of the work point of tool 18 can be suppressed.

The following will describe the relationship between joint angle $\theta_3$ of third joint J3 and an error with respect to the target position of the work point of tool 18.

Figure 10:
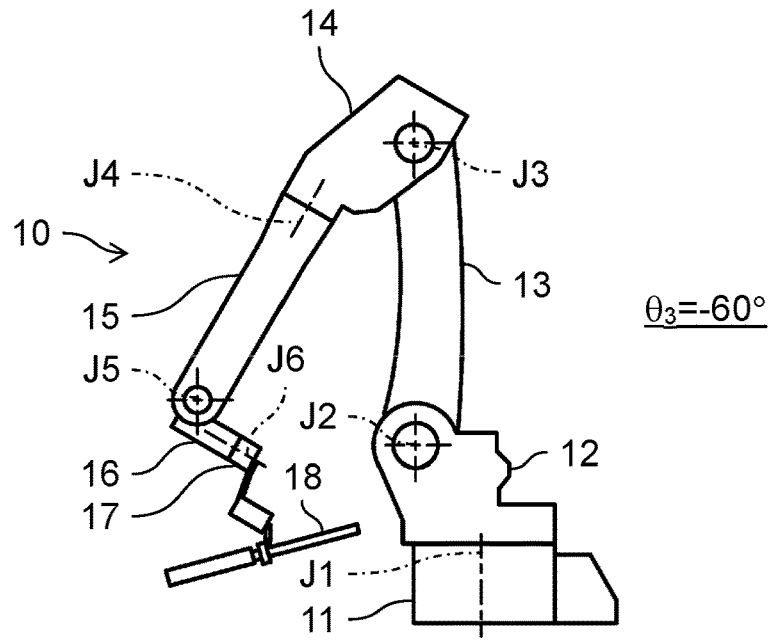
FIG. 10 is a view illustrating the position of the robot arm when a joint angle of a third joint is set to −60°.

First, as illustrated in FIG. 10, lower arm 13 of robot arm 10 is assumed to be in a vertically extending upward position. In a state in which first upper arm 14 and second upper arm 15 are linearly extended, joint angle $\theta_3$ of third joint J3 is set to −60°. In this state, first upper arm 14 and second upper arm of robot arm 10 extend obliquely downward to the left in FIG. 10.

Figure 11:
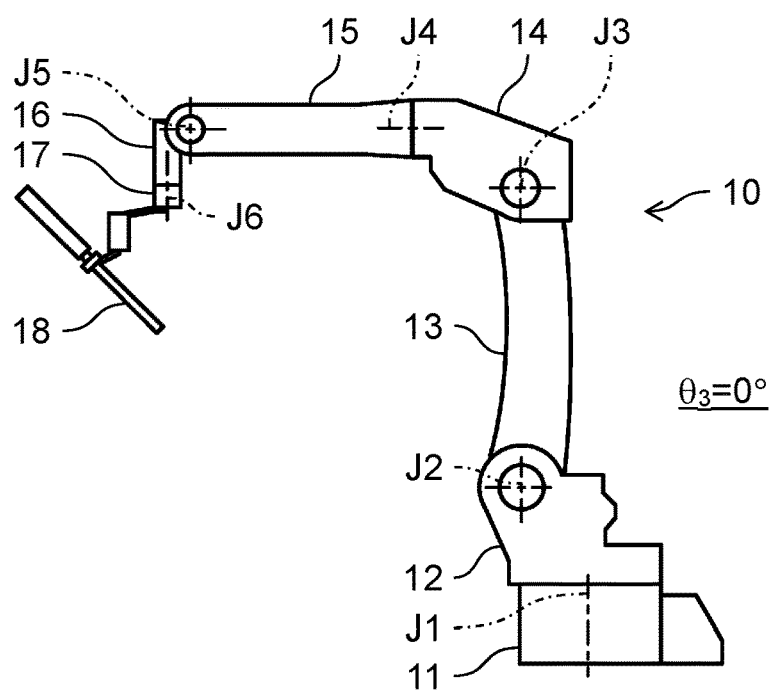
FIG. 11 is a view illustrating the position of the robot arm when the joint angle of the third joint is set to 0°.

Next, as illustrated in FIG. 11, joint angle $\theta_3$ of third joint J3 is set to 0°. In this state, first upper arm 14 and second upper arm 15 of robot arm 10 extend horizontally leftward in FIG. 11.

Figure 12:
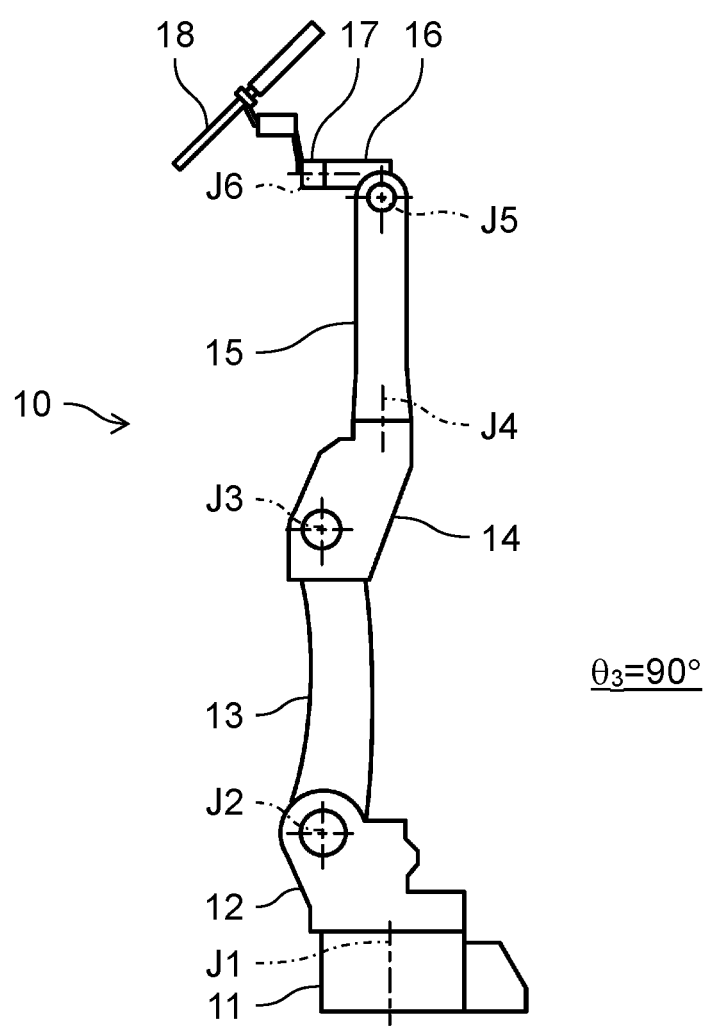
FIG. 12 is a view illustrating the position of the robot arm when the joint angle of the third joint is set to 90°.

As illustrated in FIG. 12, joint angle $\theta$ 3 of third joint J3 is set to 90°. In this state, first upper arm 14 and second upper arm 15 of robot arm 10 extend vertically upward in FIG. 12.

Figure 13:
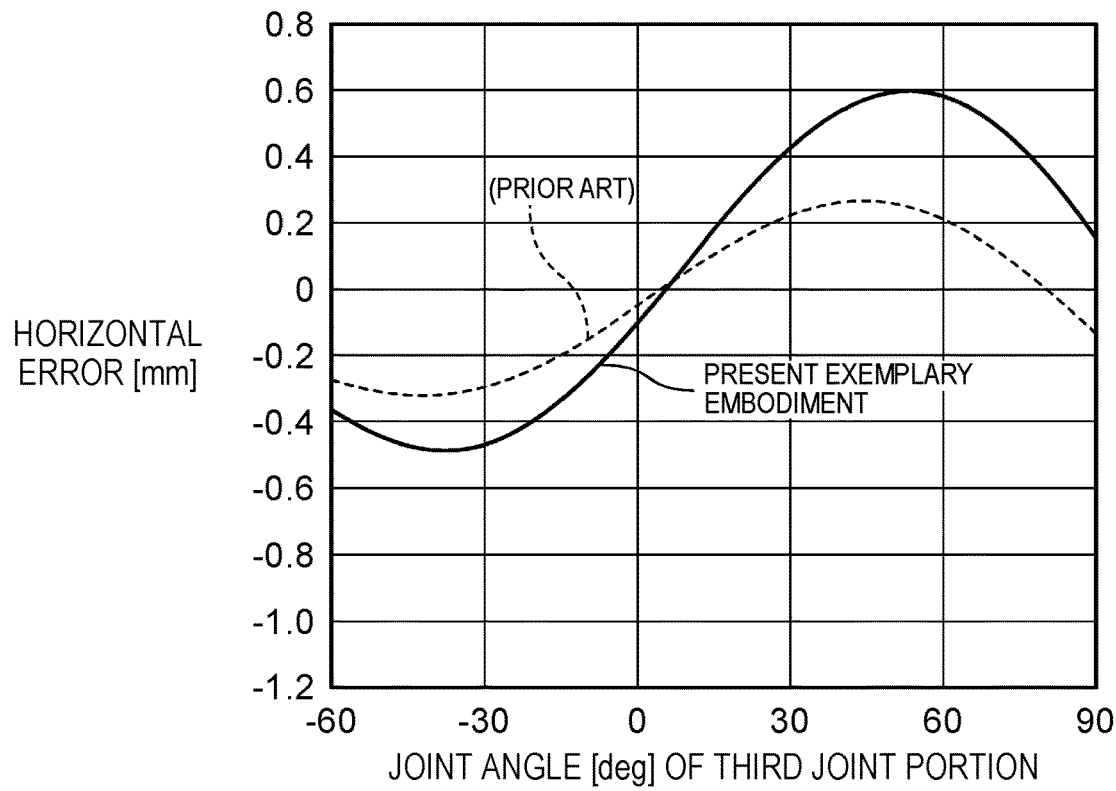
FIG. 13 is a graph illustrating a relationship between the joint angle of the third joint and the horizontal error of the work point of the tool.

In this case, when robot arm 10 sequentially changes joint angle $\theta_3$ of third joint J3 so as to take the position illustrated in FIGS. 10 to 12, controller calculates the horizontal error and the vertical error of the work point of tool 18 in real time. The results are illustrated in the graphs in FIGS. 13 and 14. With reference to FIG. 13, the dotted line indicates the relationship between joint angle $\theta_3$ of third joint J3 and the horizontal error in the conventional deflection compensation method, that is, in consideration of only the deflections generated in second joint J2 and third joint J3. In addition, the solid line indicates the relationship between joint angle $\theta_3$ of third joint J3 and the horizontal error in the deflection compensation method according to the present exemplary embodiment, that is, in consideration of all the deflections generated in first joint J1 to fourth joint J4.

Figure 14:
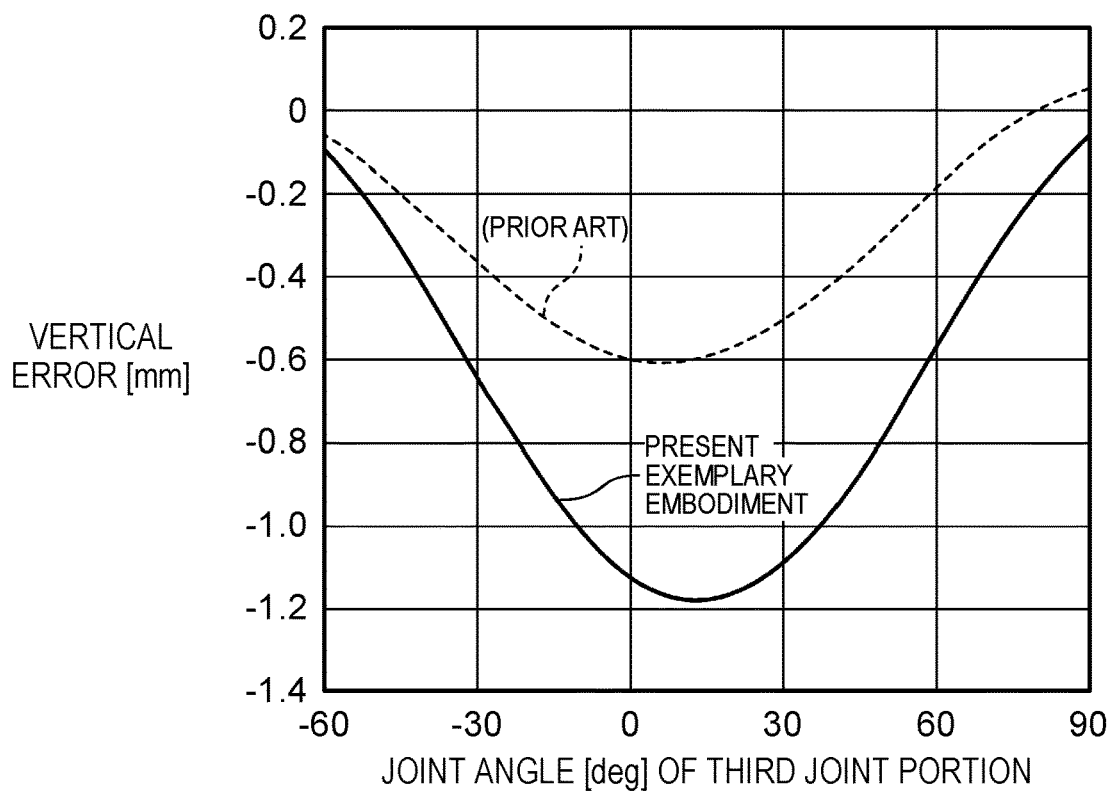
FIG. 14 is a graph illustrating a relationship between the joint angle of the third joint and the vertical error of the work point of the tool.

With reference to FIG. 14, the dotted line indicates the relationship between joint angle $\theta_3$ of third joint J3 and the vertical error in the conventional deflection compensation method. In addition, the solid line indicates the relationship between joint angle $\theta_3$ of third joint J3 and the vertical error in the deflection compensation method according to the present exemplary embodiment.

As illustrated in FIGS. 13 and 14, it can be seen that, in the deflection compensation method according to the present exemplary embodiment, the large horizontal and vertical errors are calculated with respect to the target position (position corresponding to error 0) as compared with the conventional deflection compensation method.

Accordingly, in calculating a compensation amount, a compensation amount can be calculated in consideration of an actual deflection angle as compared with the conventional deflection compensation method, and the positional displacement of the work point of tool 18 can be suppressed.

As described above, the method of controlling robot 1 according to the present exemplary embodiment calculates compensation amounts $\Delta\theta_2$ and $\Delta\theta_3$ for second joint J2 and third joint J3 using not only the deflection angles of second joint J2 and third joint J3, pivotable in the gravity direction, in the pivoting direction of their rotary shafts but also the deflection angles of first joint J1 and fourth joint J4 in the tilting direction of their rotary shafts. Compensation amounts $\Delta\theta_2$ and $\Delta\theta_3$ thus calculated reduce the positional displacement of the tip of robot arm 10.

<Specific Position>

Figure 15:
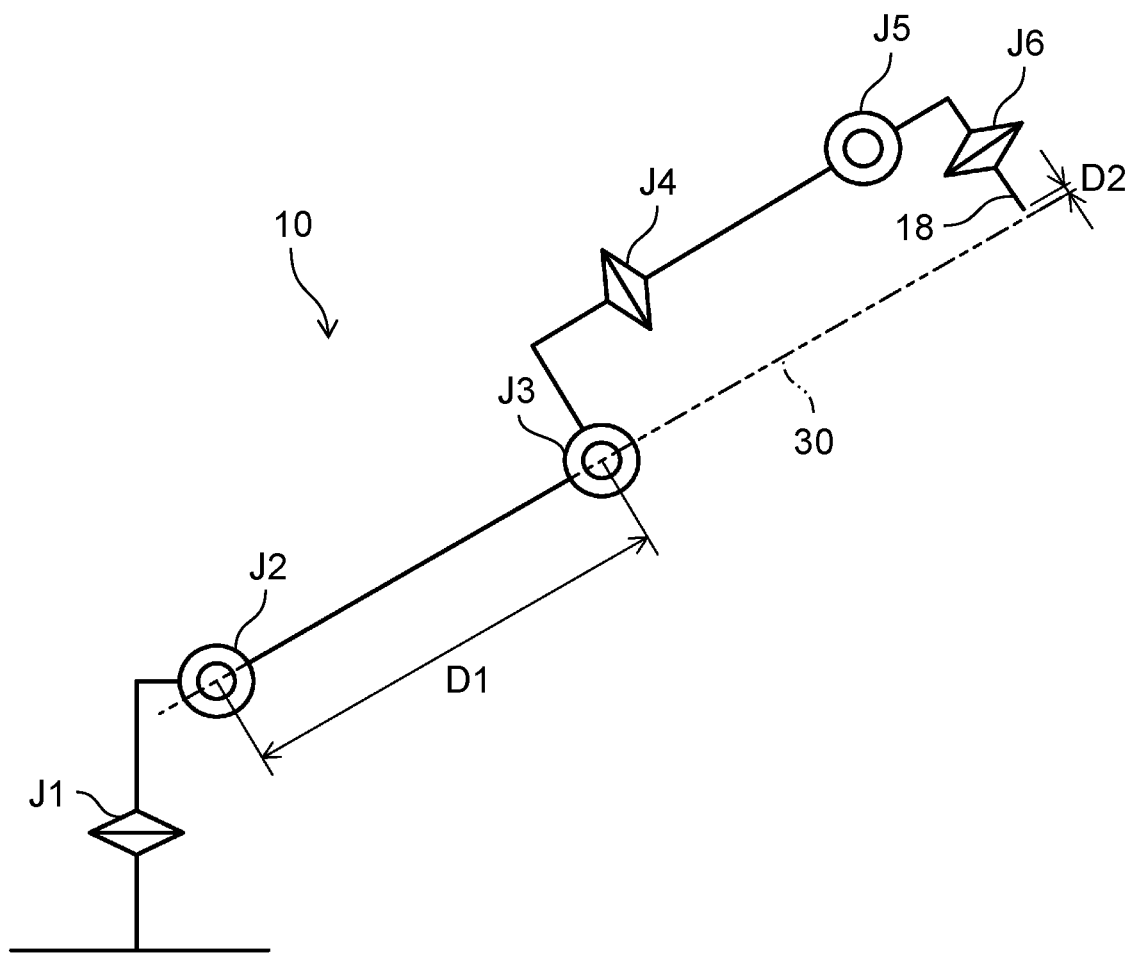
FIG. 15 is a view illustrating a state in which the robot arm is in a specific position.

The inventor of the present application has found that there is a specific position in which the deflection compensation amount rapidly increases when robot arm 10 is in a predetermined position (see FIG. 15).

More specifically, equation (3) described above derives compensation amount $\Delta\theta_2$ of second joint J2. Equation (4) described above derives compensation amount $\Delta\theta_3$ of third joint J3. Equations (3) and (4) each include ($z_3$ $r_2$−$r_3$ $z_2$) as a variable of the denominator of the second term.

In this case, the variable ($z_3 r_2$−$r_3$ $z_2$) is equivalent to the value obtained by integrating distance D1 and distance D2. Distance D1 is the distance between the axes of the rotary shafts of second joint J2 and third joint J3. Distance D2 is the distance from the work point of the tip of robot arm 10 to virtual straight line 30 passing through the axis of second joint J2 and the axis of third joint J3.

When the variable ($z_3 r_2$−$r_3 z_2$) approaches "0", the deflection compensation amount, that is, the correction angle diverges infinitely and rapidly increases. In the following description, the variable ($z_3 r_2$−$r_3 z_2$) is set as a determination value for determining a specific position.

Figure 16:
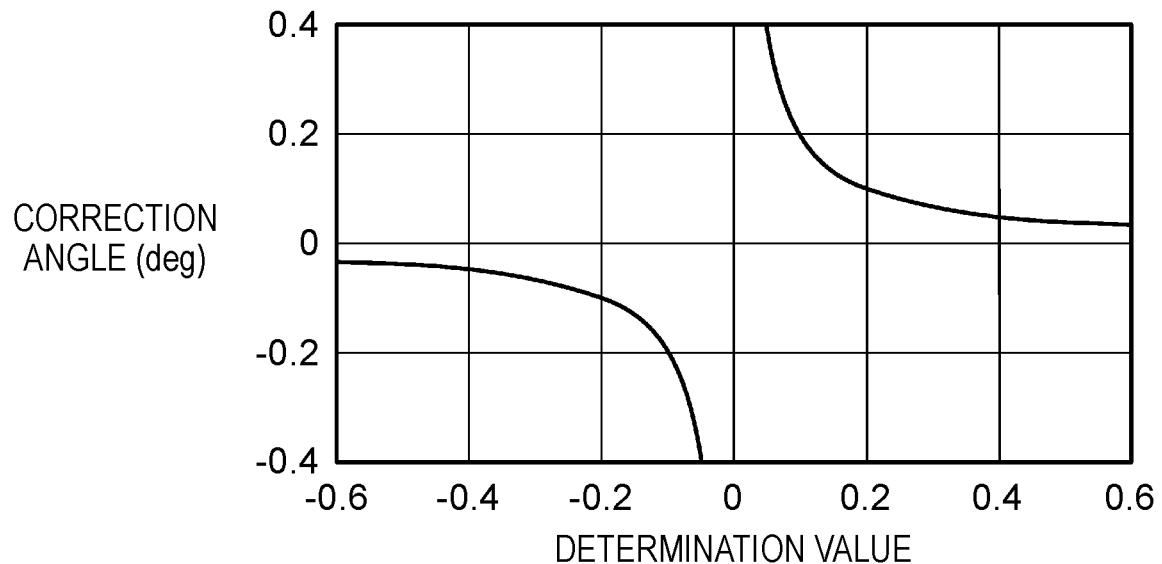
FIG. 16 is a graph illustrating a relationship between a determination value and a correction angle.

FIG. 16 is a graph illustrating the relationship between a determination value and a correction angle. In the graph in FIG. 16, for the sake of explanation, the variable of the numerator of the second term in the above-described calculation formula is set to a fixed value.

As illustrated in FIG. 16, when robot arm 10 is operated, the determination value changes from a negative value to a positive value according to the position of robot arm 10. When the determination value approaches "0" from the negative value, the correction angle diverges in the negative direction. When the determination value approaches "0" from the positive value, the correction angle diverges in the positive direction.

Therefore, when a deflection compensation amount is calculated using equations (3) and (4) described above even though robot arm 10 is in a specific position, the correction angle rapidly changes. Therefore, the safety function of robot arm 10 may work and the apparatus may stop.

Therefore, in the present exemplary embodiment, when the absolute value ($|z_3 r_2 - r_3 z_2|$) of the determination value is smaller than predetermined threshold value Dth, the calculation formula for a deflection compensation amount is changed such that the correction angle continuously changes with emphasis on stability.

Figure 17:
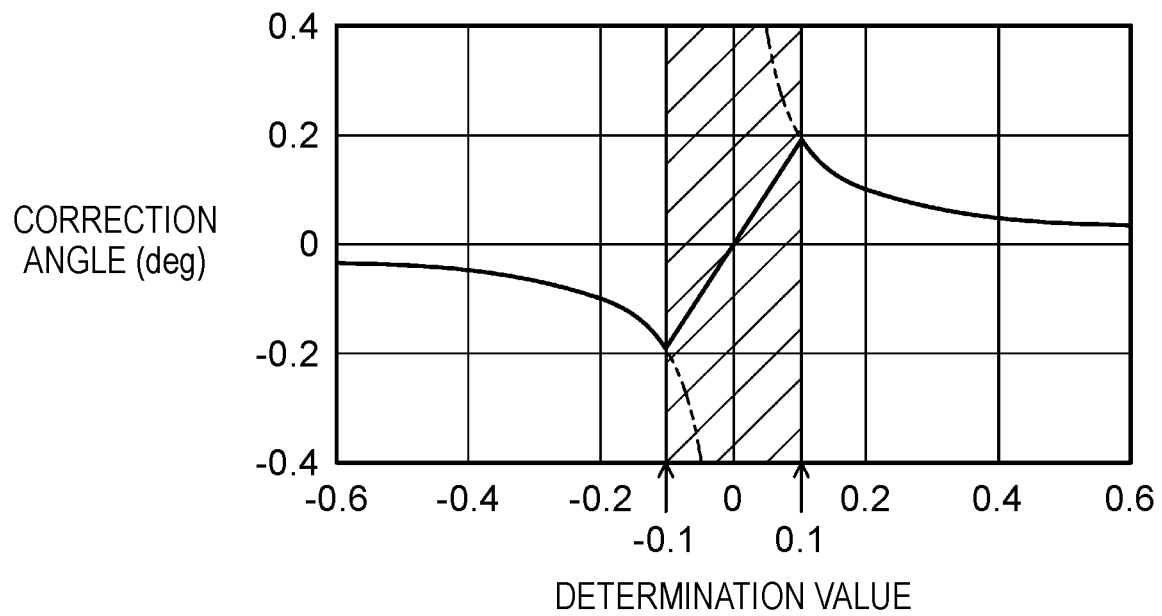
FIG. 17 is a graph illustrating the relationship between the determination value and the correction angle when a calculation formula is changed in accordance with a comparison result between the determination value and a threshold.

More specifically, in the case illustrated in FIG. 17, threshold value Dth is set to 0.1. When the absolute value of the determination value is larger than the threshold ($|z_3 r_2 - r_3 z_2| \geq Dth$), a deflection compensation amount is calculated using equations (3) and (4) described above.

On the other hand, when the absolute value of the determination value is smaller than the threshold ($|z_3 r_2 - r_3 z_2| < Dth$), the determination value is not included in the denominator of the second term, and a deflection compensation amount is calculated using a calculation formula capable of suppressing a rapid increase in the deflection compensation amount.

For example, in the hatched range (from −0.1 to +0.1) in FIG. 17, the absolute value of the determination value is smaller than the threshold.

Within this range, the change in correction angle may be linearly complemented as illustrated in FIG. 17. As a result, the correction angle can be continuously corrected without diverging.

A calculation formula for calculating a deflection compensation amount when the determination value is smaller than the threshold value will be described below. Compensation amount $\Delta\theta_2$ of second joint J2 can be calculated by equation (5) given below.

$$\Delta\theta_2 = (\tau_2/k_2) + (z_3 \Sigma r - r_3 \Sigma_z)(z_3 r_2 - r_3 z_2)/Dth^2 \quad (5)$$

That is, compensation amount $\Delta\theta_2$ of second joint J2 is calculated based on the deflection angles of first joint J1, second joint J2, and fourth joint J4, and threshold value Dth.

Compensation amount $\Delta\theta_3$ for third joint J3 can be calculated by equation (6) given below.

$$\Delta\theta_3 = (\tau_3/k_3) + (r_2 \cdot \Sigma z - z_2 \cdot \Sigma_r)(z_3 r_2 - r_3 z_2)/Dth^2 \quad (6)$$

That is, compensation amount $\Delta\theta_3$ of third joint J3 is calculated based on the deflection angles of first joint J1, third joint J3, and fourth joint J4, and threshold value Dth.

Figure 18:
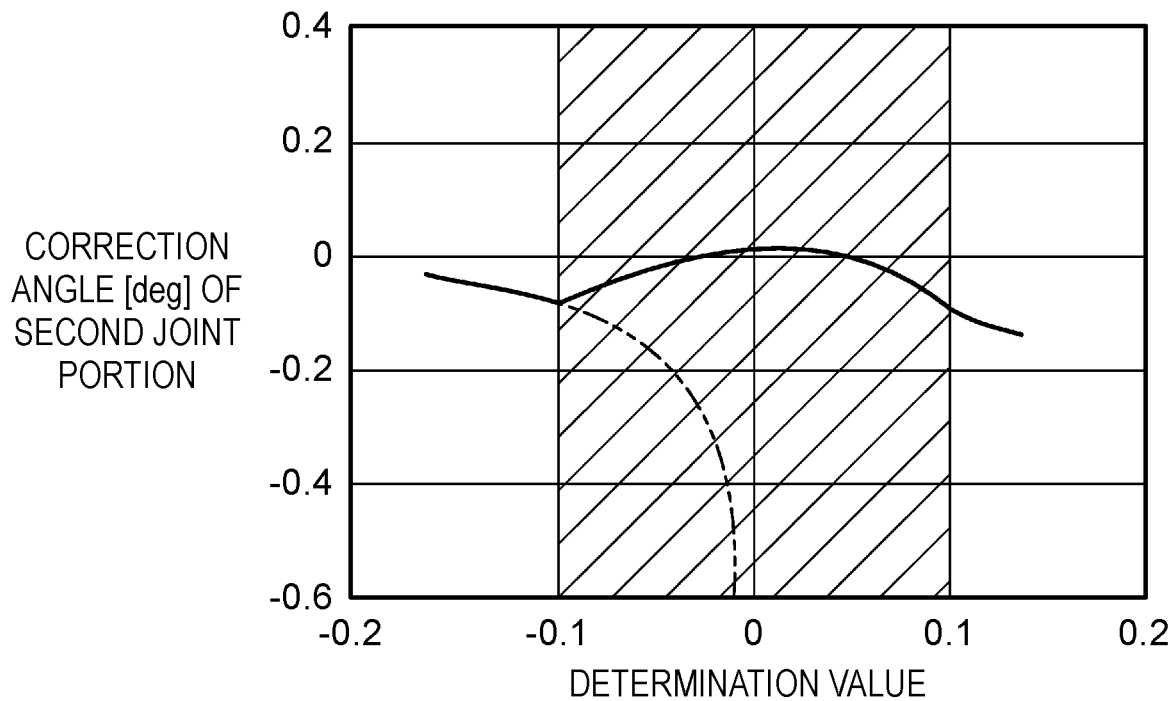
FIG. 18 is a graph illustrating a relationship between the determination value and the correction angle of the second joint.

FIG. 18 is a graph illustrating a change in correction angle that is a compensation amount for second joint J2. The graph in FIG. 18 illustrates the actual correction angle of second joint J2. That is, the variable of the numerator of the second term in the calculation formula for a deflection compensation amount also varies. In addition, in the case illustrated in FIG. 18, threshold value Dth is set to 0.1.

In the region where the determination value is smaller than −0.1 and the region where the determination value is larger than 0.1, compensation amount $\Delta\theta_2$ of second joint J2 is calculated using equation (3) described above. On the other hand, within the hatched threshold range (from −0.1 to +0.1) in FIG. 18, compensation amount $\Delta\theta_2$ of second joint J2 is calculated using equation (5) described above.

Figure 19:
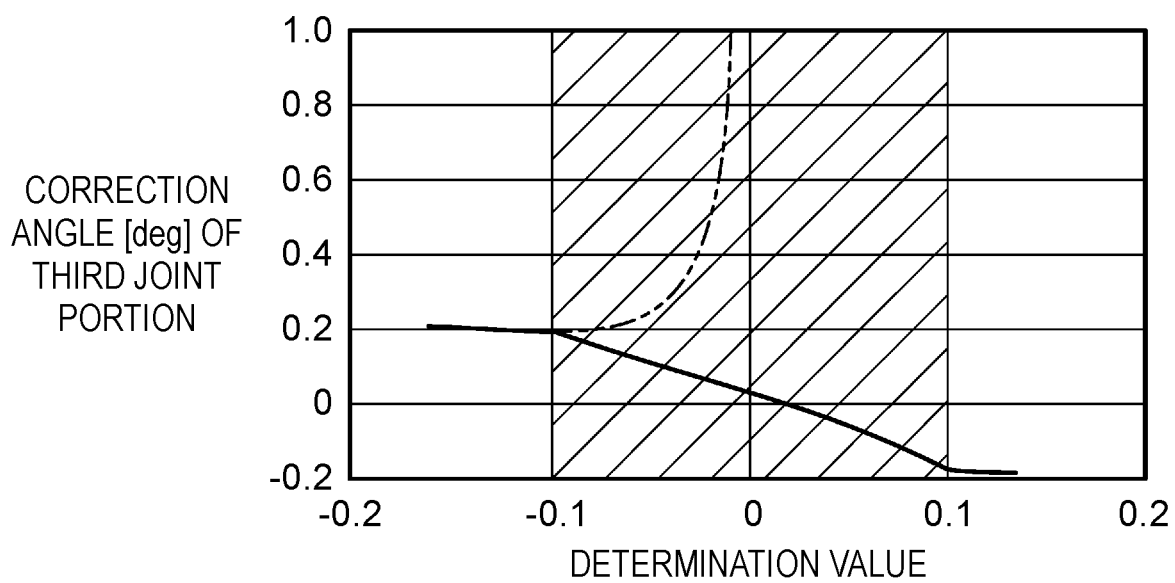
FIG. 19 is a graph illustrating a relationship between the determination value and the correction angle of the third joint.

FIG. 19 is a graph illustrating a change in correction angle that is a compensation amount for third joint J3. The graph in FIG. 19 illustrates the actual correction angle of third joint J3. That is, the variable of the numerator of the second term in the calculation formula for a deflection compensation amount also varies. In the case illustrated in FIG. 19, threshold value Dth is set to 0.1.

In the region where the determination value is smaller than −0.1 and the region where the determination value is larger than 0.1, compensation amount $\Delta\theta_3$ of third joint J3 is calculated using equation (4) described above. On the other hand, within the hatched threshold range (from −0.1 to +0.1) in FIG. 19, compensation amount $\Delta\theta_3$ of third joint J3 is calculated using equation (6) described above.

As described above, in the case illustrated in FIGS. 18 and 19, it can be seen that the deflection compensation amount can be continuously corrected without being increased in second joint J2 and third joint J3. This makes it possible to continuously correct the operation of robot arm 10 and suppress unstable control.

In the above exemplary embodiment, robot arm 10 includes first joint J1, second joint J2, third joint J3, and fourth joint J4 in this order. The present invention is also applicable to a robot arm including first joint J1 to fourth joint J4 in an order different from that in the above exemplary embodiment. For example, the robot arm may include first joint J1, fourth joint J4, second joint J2, and third joint J3 in this order. Similarly to the exemplary embodiment, first joint J1 and fourth joint J4 are configured such that the tilt of each rotary shaft affects the positional displacement of the tip of robot arm 10. Similarly to the exemplary embodiment, second joint J2 and third joint J3 are configured such that each rotary shaft rotates in the gravity direction.

INDUSTRIAL APPLICABILITY

As described above, the present invention is extremely useful and has high industrial applicability because it is possible to obtain a highly practical effect that the positional displacement of the tip of the robot arm due to the deflections of the joint of the robot arm can be suppressed.

REFERENCE MARKS IN THE DRAWINGS 1 robot
10 robot arm
30 virtual straight line
J1 first joint
J2 second joint
J3 third joint
J4 fourth joint

The invention claimed is:

1. A robot control method of controlling an operation of a robot arm including at least a first joint, a second joint, a third joint, and a fourth joint,
   the first joint, the second joint, the third joint, and the fourth joint each having a rotary shaft,
   the first joint and the fourth joint being configured such that tilts of the respective rotary shafts affect positional displacement of a tip of the robot arm, and
   the second joint and the third joint being configured such that the rotary shaft of each of the second joint and the third joint rotates in a gravity direction, the robot control method comprising:
   calculating a deflection angle of the first joint based on moment rigidity of the first joint and gravitational torque applied in a tilting direction of the rotary shaft of the first joint;
   calculating a deflection angle of the second joint based on a spring constant of the second joint and gravitational torque applied in a pivoting direction of the second joint;
   calculating a deflection angle of the third joint based on a spring constant of the third joint and gravitational torque applied in a pivoting direction of the third joint;

calculating a deflection angle of the fourth joint based on moment rigidity of the fourth joint and gravitational torque applied in a tilting direction of the rotary shaft of the fourth joint;

calculating a determination value based on a distance from a work point of the tip of the robot arm to a virtual straight line passing through an axis of the rotary shaft of the second joint and an axis of the rotary shaft of the third joint;

comparing the determination value with a predetermined threshold;

calculating a deflection compensation amount for the second joint based on deflection angles of the first joint, the second joint, and the fourth joint and calculating a deflection compensation amount for the third joint based on deflection angles of the first joint, the third joint, and the fourth joint when the determination value is larger than the predetermined threshold value;

calculating a deflection compensation amount for the second joint based on deflection angles of the first joint, the second joint, and the fourth joint, and the predetermined threshold value and calculating a deflection compensation amount for the third joint based on deflection angles of the first joint, the third joint, and the fourth joint, and the predetermined threshold value when the determination value is smaller than the predetermined threshold value; and causing the second joint and the third joint to pivot based on the deflection compensation amounts for the second joint and the third joint.

2. The robot control method according to claim 1, wherein the determination value is a value obtained by integrating a distance between the axes of the rotary shafts of the second joint and the third joint and the distance from the work point of the tip of the robot arm to the virtual straight line.

* * * * *